T. SPENCER.
SWITCH FOR ELECTRIC LIGHTING SYSTEMS.
APPLICATION FILED JAN. 17, 1913.
1,145,041.
Patented July 6, 1915.
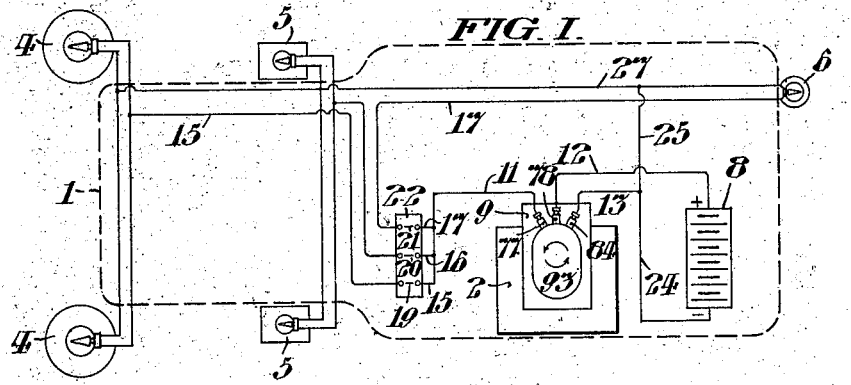
FIG. I.
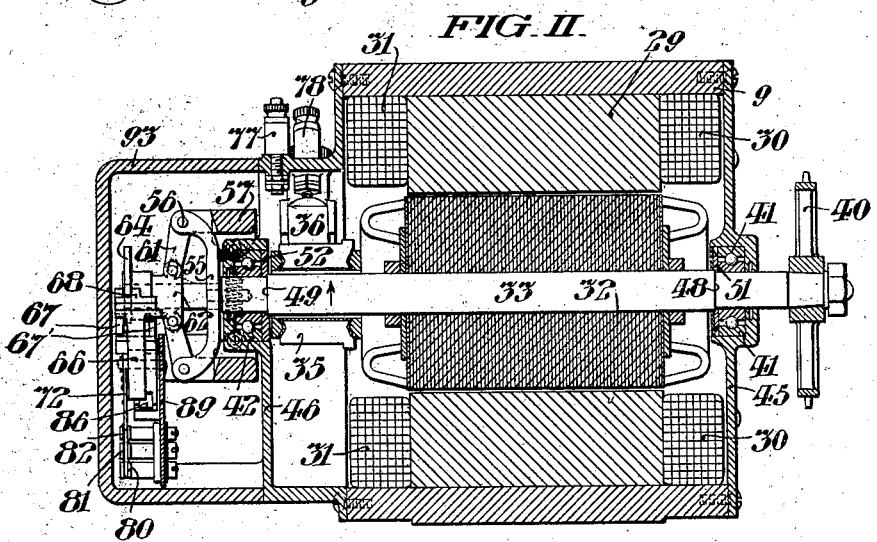
FIG. II.
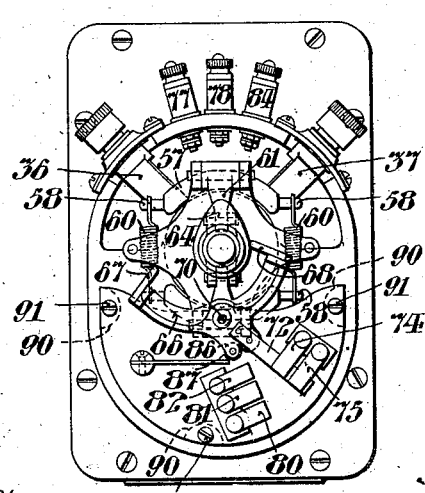
FIG. III.
WITNESSES:
Philip W. Vessey.
James McCabe.
INVENTOR:
Thomas Spencer
by Arthur E. Paige
Attorney.

UNITED STATES PATENT OFFICE.

THOMAS SPENCER, OF PHILADELPHIA, PENNSYLVANIA, ASSIGNOR TO HELIOS MANUFACTURING COMPANY, OF PHILADELPHIA, PENNSYLVANIA, A CORPORATION OF PENNSYLVANIA.

SWITCH FOR ELECTRIC-LIGHTING SYSTEMS.

1,145,041. Specification of Letters Patent. Patented July 6, 1915.

Application filed January 17, 1913. Serial No. 742,549.

*To all whom it may concern:*

Be it known that I, THOMAS SPENCER, of Philadelphia, in the State of Pennsylvania, have invented a certain new and useful Improvement in Switches for Electric-Lighting Systems, whereof the following is a specification, reference being had to the accompanying drawings.

My invention is particularly designed for inclusion in an automobile to light the head, side and tail lamps thereof, and, as hereinafter described, the principal feature of the invention is an automatically controlled switch for a generator which is arranged to be driven by the running gear of the vehicle whereby said generator is included in the lighting circuit only when the automobile is going from ten to twenty-five miles an hour. Said circuit includes a storage battery in which the surplus energy of the generator is stored and which serves to maintain said lights when the generator is rendered inoperative by said switch. As hereinafter described the specific form of switch which is automatically operated as above contemplated includes centrifugal members which are carried by the generator armature shaft in operative connection with a cam on said shaft so as to shift said cam axially to and from position to encounter a lever which is operatively connected with the switch mechanism.

My invention includes the various novel features of construction and arrangement hereinafter more definitely specified.

In the drawings; Figure I is a diagram of an electric lighting system for an automobile, conveniently embodying my invention. Fig. II is a longitudinal sectional view of the generator and automatic switch mechanism indicated in Fig. I. Fig. III is a left hand end view of the mechanism shown in Fig. II, with the switch cover removed.

Referring to Fig. I; 1 indicates an automobile having a variable speed motor 2 by which it is propelled and a pair of head lamps 4, a pair of side lamps 5 and a tail lamp 6 in circuit with the storage battery 8 and electric generator 9; said generator being operatively connected with said motor 2. Said generator is connected with said circuit by three conductors 11, 12 and 13. Said conductor 11 has three branches 15, 16 and 17 respectively leading to the head lamps 4, the side lamps 5 and the tail lamp 6 through switches 19, 20 and 21 which are conveniently mounted on the switch board 22. Said conductor 12 extends to the positive pole of said battery 8, and said conductor 13 has branches 24 and 25 respectively leading to the negative pole of said battery and to the common return conductor 27 of said lamps. Said generator 9 includes the field magnets 29, the shunt and series field coils 30 and 31, the armature 32 having the shaft 33, and, the commutator 35 and brushes 36 and 37, and may be operatively connected with said variable speed motor 2 by any suitable means, conveniently by a chain belt engaging the sprocket wheel 40 on said armature shaft 33, so as to rotate the latter in the direction of the arrows shown in Figs. I and II during the forward movement of the automobile. Said armature shaft 33 is journaled in the ball bearings 41 and 42 respectively in the generator frame plates 45 and 46 and is prevented from moving axially by engagement of the shoulders 48 and 49, on said shaft, with the respective bearing plates 51 and 52 in said frame plates 45 and 46. Said shaft 33 carries the yoke 55 which has the pivot bearings 56 carrying the centrifugal members including the weighted arms 57 provided with the spring pins 58 connected by the springs 60 which tend to retract said members to the position shown in Fig. II. Said members also include the arms 61 which are pivotally connected with the sleeve 62 which is fitted to slide axially on said shaft 33 and carries the cam 64. It is to be understood that the arrangement is such that said cam is shifted axially on said shaft 33 in accordance with the speed of rotation of the latter. In accordance with the rate of rotation of said armature shaft 33, said cam 64 is presented in operative relation with the cam lever 66, so as to encounter the tappet arm 67 of said lever at low speeds, the central tappet arm 68 at speeds between 10 and 25 miles per hour and the tappet arm 67' at speeds exceeding 25 miles per hour for instance. Tappet arms 67 and 67' are spaced apart but located on the same side of, and at the same distance from, the fulcrum 70 of the cam lever 66. The tappet arm 68 is on the opposite side of the fulcrum and between the tappet arms 67 and 67' so that the rotating cam 64 strikes the arms 67, 68 and 67' successively, as the weighted arms 57 are thrown outward. Said cam lever 66 carries the switch contact arm 72, conveniently a spring blade, adapted to alternately register with and connect stationary spring contacts upon respectively opposite sides thereof, shown in Fig. III.

The connection of the exterior binding posts 77, 78 and 84 with the stationary switch contacts 80, 81, 82, 74 and 75 are immaterial as far as this invention is concerned, as I claim the switch structure in this case. It may be said however, that when the switch blade 72 connects the contacts 74 and 75, the generator is disconnected and the series field short circuited, and when in the other position, the generator is connected in circuit, with its series and shunt fields in operative position. When the cam 64 engages either tappet arm 67 or 67', the contacts 74 and 75 are connected by the contact arm 72; the generator and series field are then disconnected and the battery only is connected to the lighting circuit. However, when said cam 64 encounters the tappet arm 68 and rocks said cam lever 66 to the other extreme position, said contact arm 72 connects the three stationary spring contacts 80, 81 and 82 to connect the generator in operative relation with the lamp circuit and storage battery. In order that said cam lever 66 may be held against accidental displacement from either of its extreme positions to which it is automatically shifted by the cam 64, said lever is provided with the detent roller 86, and the spring detent 87 is adapted to be alternately engaged upon opposite sides of said roller in accordance with the position of said cam lever 66. Said stationary spring contacts 74, 75, 80, 81 and 82, and said spring detent 87, are conveniently supported in stationary relation with the generator, on the base plate 89, which is conveniently detachably connected with the posts 90 extending from the frame plate 46, by the screws 91 shown in Fig. III. All of the automatic switch mechanism above described is conveniently inclosed by the removable cover 93 as shown in Fig. II.

It is to be understood that the precise position in which the cam 64 shall be presented during the rotation of the armature shaft at any given rate may be determined by adjustment of the tension of said springs 60, and, that said lamps 4, 5 and 6 may be respectively lighted or extinguished by the switches 19, 20 and 21 whether the circuit is energized directly by the generator 9 or by the storage battery 8.

It may be observed that the construction and arrangement above described is such that said generator 9 is included in the lighting circuit when the automobile is going from ten to twenty-five miles an hour and is excluded from the lighting circuit when said automobile is going less than ten, and more than twenty-five, miles an hour. However, it may be adjusted to a different range of speed.

I do not desire to limit myself to the precise details of construction and arrangement herein set forth as it is obvious that various modifications may be made therein without departing from the essential features of my invention as defined in the appended claims.

I claim:—

1. In a generator switch, a rotating shaft, a pivoted member having an arm on each side of the pivot point, two spaced tappet lugs on one arm, and a third tappet lug on the other arm, said three lugs being respectively in different planes perpendicular to said shaft, a rotatable cam member, and means sensitive to changes in speed of said shaft to cause relative longitudinal movement between the cam and said member whereby the cam may engage the lugs and turn the member about its pivot point.

2. In a generator switch, a rotating armature shaft, a pivoting member having an arm on each side of its pivot point, a switch blade secured to said member, two spaced tappet lugs on one arm, a third tappet lug on the other arm, said three lugs being respectively spaced in different planes perpendicular to said shaft, a cam member adapted to slide longitudinally of the armature shaft, but to rotate therewith, and means sensitive to changes in speed of said armature shaft to longitudinally move said cam to engage the lugs successively and operate said switch first in one direction and then in the other at predetermined speed values.

3. In a generator switch, a rotating armature shaft, a pivoted member having an arm on each side of its pivot point, a switch blade connected therewith, switch clips on each side of said blade, two spaced tappet lugs on one arm and a third tappet lug on the other arm, said three lugs being respectively spaced in different planes perpendicular to said shaft, a cam member adapted to slide longitudinally of the armature shaft, means to cause it to rotate therewith, bell crank levers connected to the armature shaft having a weight on one of their lever arms, and their other lever arms connected to said cam whereby the cam is moved longitudinally into said three planes as the armature speed changes.

In testimony whereof, I have hereunto signed my name at Philadelphia, Pennsylvania, this sixteenth day of January, 1913.

THOMAS SPENCER.

Witnesses:
 GEORGE UPTON,
 ARTHUR E. PAIGE.